United States Patent [19]

Pierret et al.

[11] Patent Number: 5,221,886

[45] Date of Patent: Jun. 22, 1993

[54] DEVICE FOR REGULATING THE BATTERY CHARGING VOLTAGE DELIVERED BY AN ALTERNATOR

[75] Inventors: Jean M. Pierret, Paris; Didier Canitrot, La Queue En Brie, both of France; Alessio Pennisi, Milan, Italy; Fabio Marchio, Gallarate, Italy

[73] Assignees: Valeo Equipements Electriques Moteur, Creteil, France; SGS-Thomson Microelectronics SRL, Agrate Brianza, Italy

[21] Appl. No.: 796,687

[22] Filed: Nov. 25, 1991

[30] Foreign Application Priority Data

Nov. 27, 1990 [FR] France ................... 9014790

[51] Int. Cl.$^5$ .............................................. H02P 9/00
[52] U.S. Cl. .................................... 322/28; 322/99
[58] Field of Search ............... 322/25, 28, 58, 59, 322/60, 72, 73, 99, 100; 320/61, 64, 68

[56] References Cited

U.S. PATENT DOCUMENTS

| | | | |
|---|---|---|---|
| 4,316,134 | 2/1982 | Balan et al. | 322/99 |
| 4,335,344 | 6/1982 | Gant | 322/25 |
| 4,342,955 | 8/1982 | Gant | 322/25 |
| 4,360,773 | 11/1982 | Voss | 322/28 |
| 4,567,422 | 1/1986 | Sims | 322/25 |
| 4,636,706 | 1/1987 | Bowmann et al. | 322/28 |
| 4,839,576 | 6/1989 | Kaneyuki et al. | 322/25 |
| 5,051,682 | 9/1991 | Sekiguchi | 322/99 |

FOREIGN PATENT DOCUMENTS

| | | |
|---|---|---|
| 0330561 | 8/1989 | European Pat. Off. |
| 2419603 | 10/1979 | France . |
| 0613473 | 6/1978 | U.S.S.R. ................. 322/28 |

Primary Examiner—Steven L. Stephan
Assistant Examiner—Kristine Peckman

[57] ABSTRACT

The invention relates to a regulator device for charging a battery by an alternator that delivers a rectified voltage including a ripple component. The device is of the type comprising a regulator circuit acting on the mean value of the rectified alternator voltage and a regulator circuit acting on the voltages of the positive peaks of the ripple component. The regulator circuits are powered by a stabilized voltage derived from the rectified alternator voltage and the device further comprises a power stage for controlling the excitation current of the alternator. According to the invention, the device further includes a regulator circuit acting on the values of the negative peaks of the ripple component. This regulator circuit is also powered by the stabilized voltage, and capable of causing the excitation current to be reduced whenever the voltage of the negative peaks falls below a given threshold.

10 Claims, 2 Drawing Sheets

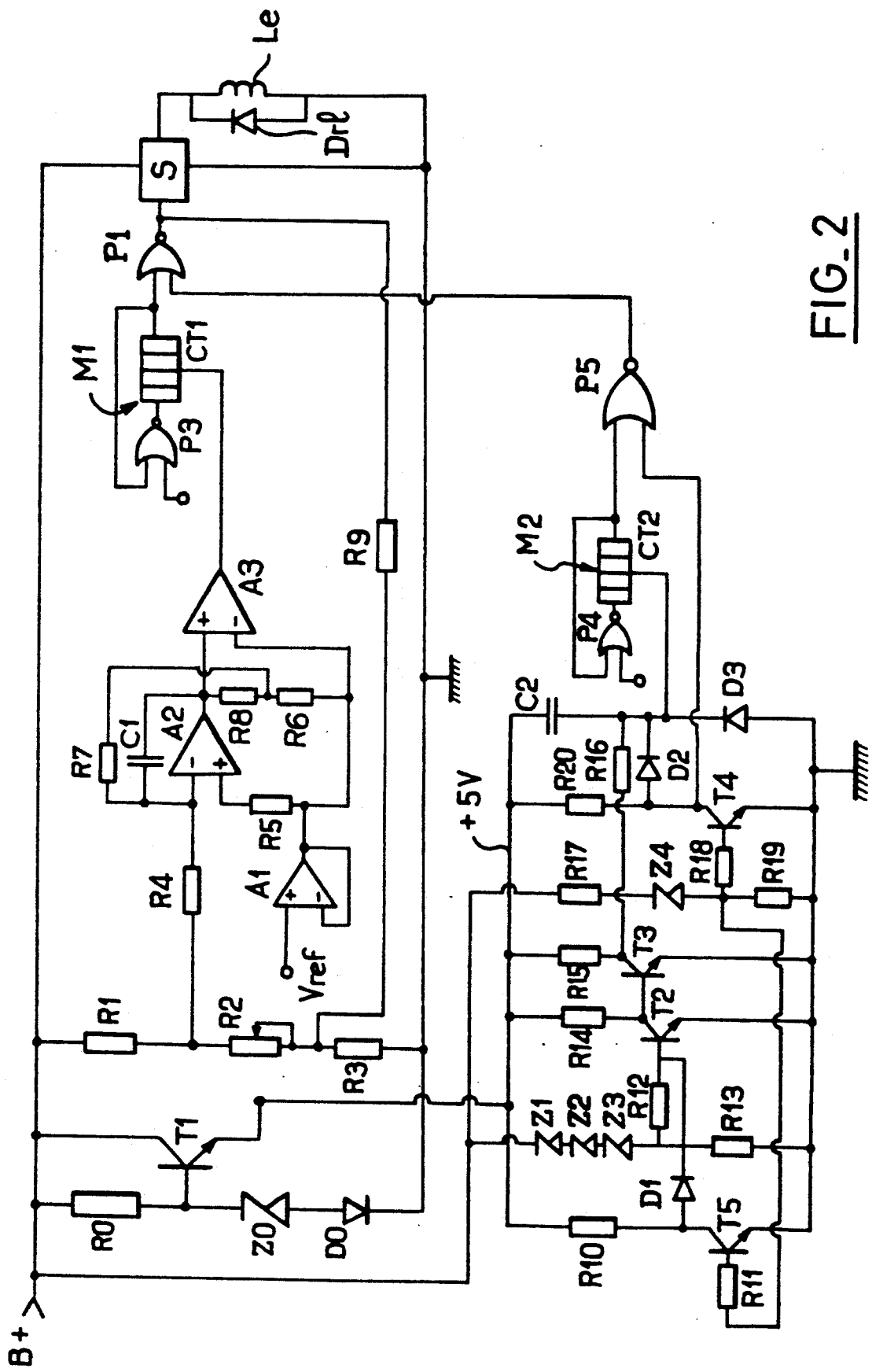
FIG._2

DEVICE FOR REGULATING THE BATTERY CHARGING VOLTAGE DELIVERED BY AN ALTERNATOR

The present invention relates in general to a regulator device for regulating the charging of a battery by means of an alternator delivering a rectified voltage including a ripple component.

BACKGROUND OF THE INVENTION

In the prior art, U.S. Pat. No. 5,079,496 in the name of the Applicant discloses a voltage regulator serving firstly to regulate the means output voltage from the alternator and secondly enabling regulation to be performed on the upper peaks of the alternator ripple included in the same signal.

The means value regulation is normally used to charge the battery at a voltage that is as uniform as possible and is close to 14.5 volts, for example.

When the voltage peaks from the alternator exceed a predetermined threshold voltage, e.g. about 19 volts, then the regulator acting on the peak values takes over from the regulator acting on the mean value to reduce the excitation current, thereby lowering the amplitude of the ripple component in the voltage. This avoids the risk of destroying the peak-clipping diodes conventionally provided in the rectifier stage at the output from the alternator. Reference may be made to the above-cited patent specification for further details on these phenomena.

Conventionally, such a regulator device is itself powered directly from the rectified output voltage from the alternator via an appropriate stabilizer stage. The power supply voltage is conventionally stabilized at about 5 volts to about 6 volts.

A drawback of this prior circuit lies in that when the rectified alternator voltage takes excessively low negative peak values, and in particular values that are lower than the above-mentioned feed voltage, then the feed voltage fails and the general operation of the regulator is severely disturbed.

The present invention seeks to mitigate this drawback and to propose a circuit of the type mentioned in the introduction which is also capable of avoiding this type of failure.

A more particular object of the invention is to achieve this result in a manner which is extremely simple and cheap.

SUMMARY OF THE INVENTION

To this end, the present invention provides a regulator device for charging a battery by means of an alternator that delivers a rectified voltage including a ripple component, the device being of the type comprising a regulator circuit acting on the mean value of the rectified alternator voltage and a regulator circuit acting on the voltages of the positive peaks of the ripple component, said regulator circuits being powered by a stabilized voltage derived form said rectified alternator voltage, the device further comprising a power stage for controlling the excitation current of the alternator, the device further including a regulator circuit acting on the values of the negative peaks of the ripple component and also powered by said stabilized voltage, and capable of causing said excitation current to be reduced whenever the voltage of said negative peaks falls below a given threshold.

BRIEF DESCRIPTION OF THE DRAWINGS

A preferred embodiment of the invention is described by way of example with reference to the accompanying drawings, in which:

FIG. 2 is a detailed circuit diagram of one possible electrical circuit for such a device.

DETAILED DESCRIPTION

Figure 1:
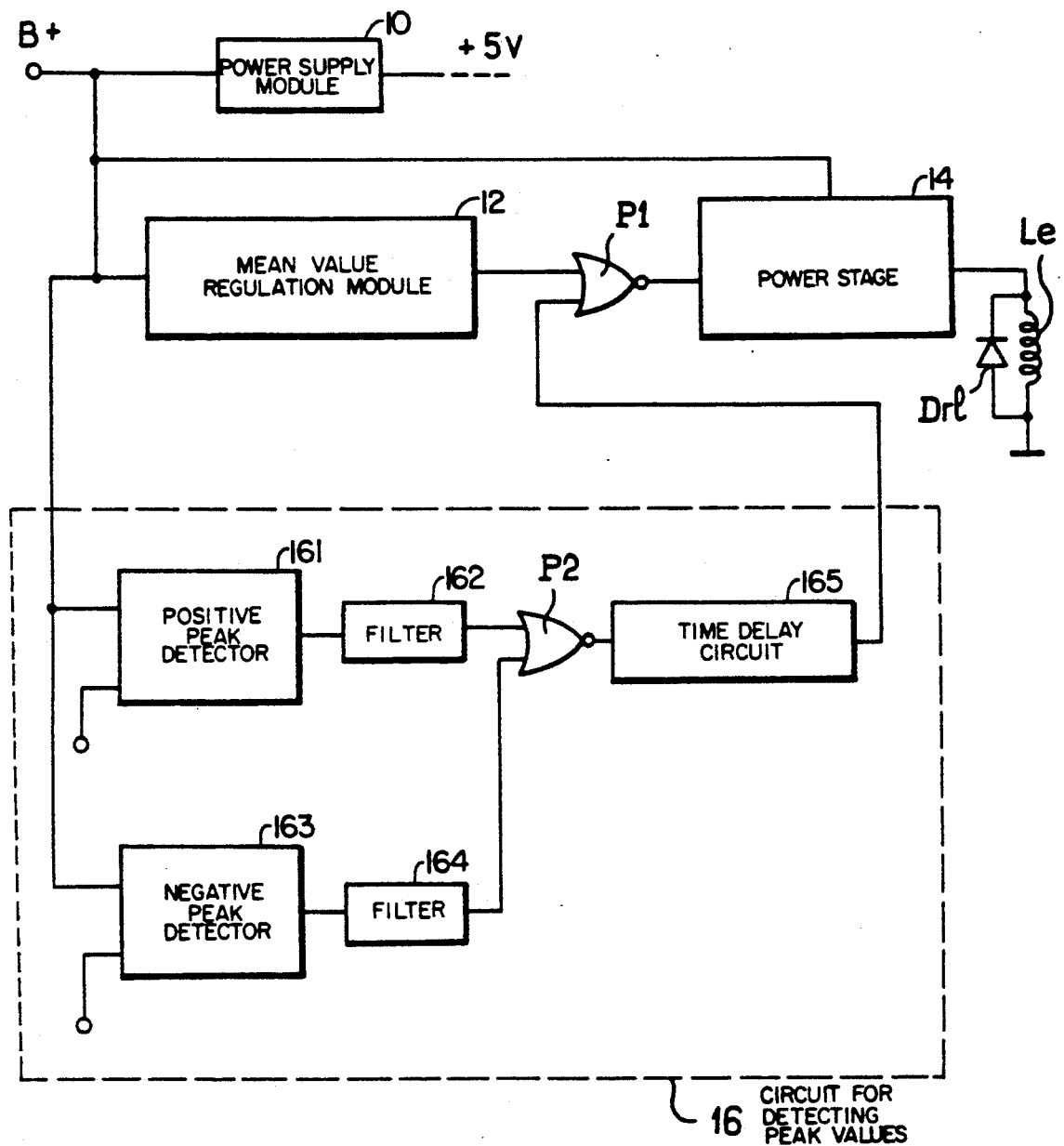
FIG. 1 is a block diagram of a regulator device of the invention.

Firstly it should be observed that items or parts that are identical or similar from one figure to another are designated therein by the same reference symbols.

With reference initially to FIG. 1, there can be seen an overall view of a regulator device for regulating a rectified alternator voltage for the purpose of applying an appropriate charging voltage to a battery in the electrical circuit of a motor vehicle.

This circuit firstly comprises a power supply module 10 which derives an appropriate stabilized voltage, e.g. +5 volts, from the rectified output voltage of the alternator, written B+.

A mean value regulation module given reference 12 has an input receiving the voltage to be regulated B+, and its output is connected to the first input of a logic gate P1 (a NOR gate) whose output is connected to the input of a power stage 14 of the device. This stage is connected to the field winding Le of the alternator and a free-wheel diode Drl is conventionally connected in parallel therewith.

The stages 12 and 14 are of conventional design, as described for example in the French patent application mentioned in the introduction, and they are not described in greater detail at this stage.

According to an essential aspect of the present invention, a circuit for detecting peak values given overall reference 16 comprises a stage 161 for detecting positive peaks having an input receiving the voltage B+ and delivering regulator pulse signals at its output, as described in greater detail below. The stage 161 is followed by a filter stage 162 whose output is connected to a first input of a logic gate P2 (a NOR gate). The circuit 16 also includes a stage for detecting negative peaks, referenced 163, whose output is applied to a filter 164. The output from the filter 164 is connected to the second input of the gate P2.

The output from the gate P2 is connected to the input of a time delay circuit 165 whose output delivers logic control signals that are applied to the second input of the gate P1.

The various stage and modules in this device are powered by the power supply circuit 10 via lines that are not shown.

From a purely functional point of view, the circuit 161 for detecting positive peaks, the filter 162, and the time delay circuit 165 are equivalent, overall, to the circuit for regulating positive peaks as described in detail in the above-mentioned patent application, whose contents is incorporated herein by reference. It may be recalled that the purpose of such a circuit is to indicate positive peaks in the voltage B+ that are greater than a given threshold value, written Vsup and equal to 19 volts, for example, with the detection signal (in the form of high and low value logic signals) then being filtered so as to take account only of the peaks in the ripple component of the rectified alternator voltage, and in particular preventing any response to low energy interference pulses that may appear in the voltage B+. When such positive peaks are detected, the power circuit is controlled, in this case via P1 and P2, to reduce the excitation current applied to the alternator, thereby reducing both the value of the mean potential B+ and the peak voltage of the positive peaks.

The purpose of performing such detection is to avoid causing the peak-clipping diodes that form a portion of the rectifier circuit (not shown) provided between the output of the alternator and the regulator device from operating under certain conditions that are excessively difficult.

According to the present invention, the circuit for detecting negative peaks that is also provided has the purpose of indicating negative peaks that descend below a predetermined lower limit (threshold Vinf), so as to avoid disturbing the stabilized power supply voltage of the device, as described above. As for detecting positive peaks, the purpose of the filter 164 is to prevent indicating occasions when the threshold Vinf is crossed due to low energy interference pulses in the voltage B+. When such negative peaks are detected, then the power circuit is controlled in such a manner as to likewise reduce the excitation current for the purpose of causing the amplitude of the ripple component in the voltage B+ to fall quickly. It should be observed here that the effect of this ripple amplitude reduction is greater than the reduction in the mean voltage which also occurs, thereby ensuring that a rise of sufficient magnitude is observed in the negative peak voltage.

For a power supply voltage stabilized at 5 volts or at 6 volts, the bottom threshold voltage for the negative peaks is preferably fixed at about 8 volts, thereby leaving a good safety margin.

The time delay circuit 165 of the peak regulator device serves to store the logic signals output by the gate P2 for a predetermined length of time, e.g. about 2 ms. By memorizing the detection logic signals for a period of time that is not less than the time between two successive peaks so as to deliver a signal to the gate P1 of sufficient duration to be capable of reducing the excitation current for a significant length of time, such a time delay has the purpose of preventing any phenomenon of latching onto the frequency of the ripple component in the voltage B+.

A concrete embodiment of a circuit implementing the various functions described above is described below with reference to FIG. 2.

The rectified alternator voltage B+ is applied to a first terminal of a resistor R0 whose second terminal is connected firstly to the base of a transistor T1 and secondly to the cathode of a zener diode Z0. The anode of Z0 is connected to ground via a diode D0 mounted in the forward conduction direction. The collector of T1 is connected to the voltage B+ and its emitter constitutes a source of stabilized voltage whose value is determined by the value of the zener diode Z0 and is 5 volts or 6 volts, for example.

A divider bridge comprising three resistors R1, R2, and R3 in series is provided between the voltage B+ and ground, and the resistor R2 may be adjustable.

The common point between R1 and R2 is connected via a resistor R4 to the inverting input of a differential amplifier A2. A reference voltage Vref fixing the threshold for regulation on the mean value of B+ is applied to the non-inverting input of a differential amplifier A1 connected as a buffer amplifier, and having its output connected to the non-inverting input of A2 via a resistor R5. The output of A1 is also connected to a first terminal of a resistor R6 whose second terminal is connected firstly to the inverting input of A2 via a resistor R7 and to the output of A2 via a resistor R8. The output of A1 is also connected to the inverting input of a third differential amplifier A3 whose non-inverting input is directly connected to the output of A2. The output of A3 is connected to a time delay circuit M1 organized around a countercircuit CT1 and a NOR gate P3 receiving a clock signal generated by appropriate means (not shown). The output from the circuit M1 is connected to a first input of the NOR gate P1 whose output is connected to the power stage S of the regulator, shown diagrammatically and known per se, and organized around one or more appropriate power transistors. The output from the stage 14 is connected to a first terminal of the excitation winding Le of the alternator and to the cathode of the parallel connected free-wheel diode Drl, with the second terminals of the winding and of the diode being connected to ground. Finally, a resistor R9 connects the output of P1 to the common point between the resistors R2 and R3.

The peak detection circuit is now described in detail. It comprises an NPN transistor T5 whose collector is connected to the +5V line via a resistor R10. The base of T5 is connected to a first terminal of a resistor R11 and its emitter is connected directly to ground.

The collector of T5 is also connected to the anode of the diode D1 whose cathode is connected to the base of an NPN transistor T2. The base of T2 is also connected via a resistor R12 to the common point between a series connection of a resistor R13 and three zener diodes Z1, Z2, and Z3. The other terminal of the series connection Z1, Z2, and Z3 is connected to the potential B+, while the other terminal of R13 is connected to ground. The collector of T2 is connected to the +5 V line via a resistor R14 and its emitter is connected directly to ground. Naturally the series connection of a plurality of zener diodes could be replaced by a single zener diode.

The collector of T2 is also connected to the base of an NPN transistor T3 whose emitter is connected to ground and whose collector resistor R15 connects its collector to the +5V line.

The collector of T3 is connected to a first terminal of a resistor R16 whose second terminal is connected to the input of a time delay circuit M2 which is described in detail below.

The potential B+ is also applied to a first terminal of a resistor R17 whose second terminal is connected to the cathode of a zener diode Z4. The anode of Z4 is connected via a resistor R18 to the base of an NPN transistor T4 and via a resistor R19 to ground. The common point between R18, R19, and Z4 is connected to the second terminal of above-mentioned resistor R11.

The emitter of T4 is connected to ground and a collector resistor R20 is provided therefor connected to the +5V line. The collector of T4 is also collected to the anode of a diode D2 whose cathode is connected to the input of the circuit M2.

Finally, a capacitor C2 is connected between the +5V line and the input of the circuit M2, with a diode D3 being reversed connected between ground and said input to the circuit M2.

The circuit M12 is organized around a counter circuit CT2 and a NOR gate P4 which receives a clock signal. The circuit M2 is associated with a NOR gate P5 having a first input connected to the output of CT2 and a second input connected to the collector of T4. The output of P5 which constitutes the output of the time delay circuit M2 is connected to the second input of above-mentioned gate P1.

The operation of the mean value regulator circuit is described briefly: the input Vref and the amplifier A1 constitute the voltage reference circuit. The active filter used to obtain the mean value of B+ is organized around A2, while A3 acts as a comparator between the mean value and the reference voltage Vref. The time delay circuit M1 serves to impart a sufficient width to the pulses applied at P1 to have a significant influence on the excitation current while avoiding any latching onto the frequency of the ripple component B+. By way of example, the time delay involved may be set at about 2 ms.

It may be observed here that the resistor R9 is a negative feedback resistor which, by selectively conveying an offset to the fraction of the potential B+ obtained by the resistors R1, R2, and R3 as a function of the output state of M1, serves to increase the frequency of the regulation cycle when the alternator is delivering close to its maximum, so as to avoid it falling in very low frequencies in which fluctuations in the potential B+ could be perceptible and troublesome.

The general operation of the circuit of the invention for detecting positive and negative peak values is now described.

Firstly, the transistor T1 delivers the stabilized positive power supply to the +5V line that is required for operation of the circuits, as explained above.

The positive peak detector is organized in this case around the transistor T2 and the three zener diodes Z1, Z2, and Z3, while the negative peak detector is organized around the transistor T4 and the zener diode Z4.

The logic gate P2 described above with reference to FIG. 1 is constituted by the transistor T3 and the diode D2.

In addition, the two filters 162 and 164 described above with reference to FIG. 1 are constituted in this case by a single filter constituted by the capacitor C2 and the resistors R20 and R16. This solution saves one capacitor, thereby reducing cost price. The filter is placed directly at the input to the time delay circuit M2.

As mentioned above, the time delay circuit includes a counting circuit CT2. The purpose of this circuit is to store the logic signals provided by the positive and negative peak detectors for a period of time that is not less than the time between two successive peaks, thereby delivering a squarewave signal of sufficient duration to act effectively on the excitation current while avoiding any latching onto the frequency of the ripple component in B+. For example, the duration of the pulses delivered may be selected to be about 2 ms.

The operation of each of the above-mentioned modules is now described in detail.

a) Positive peak detector

When a positive peak in the potential B+ exceeds a given threshold set by the sum of the characteristic voltages of Z1, Z2, and Z3, then T2 is switched on and T3 is off. As a result a voltage of +5V is applied to the first terminal of R16 via R15. The initially-charged capacitor C2 therefore discharges via R16 causing the input voltage to the time delay circuit M2 to increase smoothly until it reaches a high logic level. It should be observed that the values of the resistor R16 and of the capacitor C2 constituting the filter for detecting positive peaks are designed to prevent short transient pulses (interference on the potential B+) from causing the input of M2 to reach high logic level.

It should be observed that in this situation T4 is on and does not act on the input of M2, with diode D2 being reversed biased.

b) Negative peak detector

When a negative peak of the potential B+ falls below a low threshold defined by the characteristic voltage of Z4, then T4 is switched off, thereby causing D2 to conduct. As a result the capacitor C2 discharges smoothly, mainly via R20 and D2 (and to a smaller extent via R15 and R16, which can be made negligible be selecting R20 to be much less than R15+R16).

It should be observed here that when a negative peak appears below the threshold fixed by Z4, the transistor T3 would normally be on as described above and would therefore tend to oppose the discharge of C2 by connecting it via R16 to ground. The stage based on the transistor T5 serves to avoid this phenomenon. More precisely, T5 switches off at the same time as T4, thereby switching T2 on and T3 off. Thus, while a negative peak is being detected, T3 is prevented from opposing the discharge of C2, thereby enabling the high logic level to be reached at the input of the circuit M2 after a period of time which is essentially determined by the time constant R20*C2.

By way of non-limiting example, the filter circuits organized around the capacitor C2 may give rise to the following delays:

positive peak detection 7 μs;

negative peak detection 2.5 μs; and return to normal conditions 7 μs.

It will be understood that the logic signals provided by the positive and negative peak detectors respectively are combined in the manner of an OR gate (equivalent to the gate P2 in FIG. 1) at the input to the time delay circuit M2 by means of T3-R16 and T4-D2. The signal is at low level if the positive peaks are below the upper threshold Vsup while the negative peaks are simultaneously above the lower threshold Vinf, and it passes to high level as soon as either of these thresholds is crossed. This has the effect of setting the output of CT2 to low level throughout the time delay period. It should be observed that detecting a negative peak switches off T4 for a period of time that is negligible compared with the time delay, such that T4 can be considered, in practice, as being always switched on. Under these conditions, P5 acts solely as an inverter of the logic levels output by CT2.

As explained below, this causes a positive squarewave pulse of appropriate duration to appear at the output of the time delay circuit M2, which signal is combined with the logic signal for regulation on the mean value by the gate P1 for the purpose of reducing the excitation current which has the consequence of reducing the amplitude of the ripple component in the voltage B+ and thus of bringing back the positive peaks or the negative peaks as the case may be to below or above the corresponding thresholds Vsup and Vinf so as to return the situation to normal.

More precisely, applying a high logic signal of predetermined duration to the second input of the gate P1 has the effect of forcing said gate to low level regardless of the state of its first input (which performs mean value regulation), thereby opening the power circuit that includes the excitation winding of the alternator and thus reducing the excitation current.

It can be seen above that the gate P5 of the circuit M5 is firstly a logic level adaptor circuit which inverts the logic levels generated by the output of the counter CT2 so that they match the second input of the gate P1. Another purpose of this gate P5 is to inhibit the action of the peak value regulation circuit which would otherwise block the power stage of the regulator if the vehicle battery has just been discharged. More precisely, when the battery voltage is permanently below the low threshold for peak regulation, i.e. 8 volts in this case, then T4 is permanently off and a high logic level is applied to the second input of P5. This has the effect of preventing the gate P1 and the power circuit from receiving the signals that would normally have the effect of reducing the excitation current. Operation of the circuit is thus not disturbed when the battery is discharged.

Naturally, the present invention is not limited to the embodiment described above and shown in the drawing, and the person skilled in the art will be able to make any variant or modification coming within the spirit of the invention.

It should be observed that the regulator device of the present invention can be implemented equally well in single function regulators and in multifunction regulators, and the person skilled in the art will naturally be capable of making the necessary adaptations.

We claim:

1. A regulator device for charging a battery by means of an alternator that delivers a rectified alternator voltage including a ripple component, the regulator device being of the type comprising a regulator circuit acting on a mean value of the rectified alternator voltage and a regulator circuit acting on positive voltage peaks of a ripple component, said regulator circuits being powered by a stabilized voltage derived from said rectified alternator voltage, the regulator device further comprising a power stage for controlling an excitation current of the alternator, the regulator device further including a regulator circuit acting on negative voltage peaks of the ripple component and also powered by said stabilized voltage, and capable of causing said excitation current to be reduced whenever said negative voltage peaks fall below a given threshold.

2. A regulator device according to claim 1, wherein the regulator circuit acting on the negative voltage peaks comprises a detection circuit and a filter.

3. A regulator device according to claim 2, wherein the filter is common to the regulator circuit acting on the negative voltage peaks and to the regulator circuit acting on the positive voltage peaks.

4. A regulator device according to claim 1, including a time delay circuit at the output side of the regulator circuit acting on the negative voltage peaks.

5. A regulator device according to claim 4, including means for combining logic signals delivered by the regulator circuit acting on the negative voltage peaks and by the regulator circuit acting on the positive voltage peaks on the input side of said time delay circuit.

6. A regulator device according to claim 1, wherein the regulator circuit acting on the positive voltage peaks and the regulator circuit acting on the negative voltage peaks both comprise a connection stage including a transistor whose base receives the rectified alternator voltage via at least one zener diode.

7. A regulator device according to claim 5, including a logic gate combining regulation logic signals acting on the mean value of the rectified alternator voltage and the combined logic signals acting on the positive voltage peaks and the negative voltage peaks.

8. A regulator device according to claim 4, wherein the time delay circuit includes a counter circuit.

9. A regulator device according to claim 4, wherein the regulator circuit acting on the negative voltage peaks includes means for inhibiting its action when the rectified alternator voltage lies permanently below said given threshold because the battery is discharged.

10. A regulator device according to claim 9, wherein said inhibiting means comprises a gate having a first input receiving a first detection signal at an output from the time delay circuit and having a second input receiving a second detection signal at an input of the time delay circuit.

* * * * *